United States Patent
Jagadish et al.

(10) Patent No.: US 7,945,733 B2
(45) Date of Patent: May 17, 2011

(54) HIERARCHICAL STORAGE MANAGEMENT (HSM) FOR REDUNDANT ARRAY OF INDEPENDENT DISKS (RAID)

(75) Inventors: Divya Jagadish, Bangalore (IN); Anurag Sushil Chandra, Pune (IN)

(73) Assignee: LSI Corporation, Milpitas, CA (US)

( * ) Notice: Subject to any disclaimer, the term of this patent is extended or adjusted under 35 U.S.C. 154(b) by 413 days.

(21) Appl. No.: 12/333,329

(22) Filed: Dec. 12, 2008

(65) Prior Publication Data
US 2010/0153641 A1    Jun. 17, 2010

(51) Int. Cl.
*G06F 12/00*    (2006.01)
(52) U.S. Cl. ......... 711/114; 711/117; 711/156; 711/165

(58) Field of Classification Search ................ None
See application file for complete search history.

*Primary Examiner* — Shawn X Gu
(74) *Attorney, Agent, or Firm* — Prakash Nama; Global IP Services, PLLC

(57) ABSTRACT

Hierarchical storage management (HSM) for redundant array of independent disks (RAID) which comprise a plurality of drive trays of different types is disclosed. In one embodiment, a method for hierarchically managing RAID which includes a plurality of drive trays of different types, includes writing data to a tray of a first type, periodically monitoring a use of the data, and moving the data to a tray of a second type if the use of the data yields less than a threshold value. Each one of the tray of the first type and the tray of the second type includes at least one hard drive, and a composite score of price, capacity, performance, and function of the tray of the first type which is higher than a corresponding composite score of the tray of the second type.

20 Claims, 4 Drawing Sheets

HIERARCHICAL STORAGE MANAGEMENT (HSM) FOR REDUNDANT ARRAY OF INDEPENDENT DISKS (RAID)

FIELD OF TECHNOLOGY

Embodiments of the present invention relate to the field of electronics. More particularly, embodiments of the present invention relate to data management associated with a redundant array of independent disks (RAID).

BACKGROUND

A hierarchical storage management (HSM) is policy-based management of file backup and archiving that uses storage devices economically. The hierarchy in the HSM represents different types of storage media, such as hard drive, optical storage or magnetic tape, where each type of the storage media represents a different level of price, capacity, performance and function. For example, as a file ages in an archive without being accessed for a prolonged period of time, it can be automatically moved to a slower but less expensive type of storage. This frees up the faster storage space which was once occupied by the migrated file. However, until recently, the implementation of the HSM has been concentrated to storage systems having different types of storage media.

SUMMARY

A method of Hierarchical storage management (HSM) for redundant array of independent disks (RAID) is disclosed. In one aspect, a method for hierarchically managing redundant array of independent disks (RAID) which comprise a plurality of drive trays of different types includes writing data to a tray of a first type, periodically monitoring a use of the data, and moving the data to a tray of a second type if the use of the data yields less than a threshold value. Each one of the tray of the first type and the tray of the second type includes at least one hard drive. Further, a composite score of price, capacity, performance and function of the tray of the first type is calculated/determined, which higher than a corresponding composite score of the tray of the second type.

In addition, monitoring the use of the data includes determining how many times the data has been accessed for a given period of time. In other words, monitoring the use of the data includes determining how long the data has been idle. For example, moving the data to the tray of the second type includes generating a stub for the data which points to a location of the data on the tray of the second type. Furthermore, the stub is accessed to retrieve the data from the tray of the second type.

In another aspect, a RAID controller coupled to a host and a plurality of trays of different types for hierarchically managing redundant array of independent disks (RAID), includes a write module for writing data to a tray of a first type, a monitor module for periodically monitoring a use of the data, and a transfer module for moving the data to a tray of a second type if the use of the data yields less than a threshold value. Each one of the tray of the first type and the tray of the second type includes at least one hard drive. A composite score of price, capacity, performance and function of the tray of the first type is calculated. This score is higher than a respective composite score of the tray of the second type.

Further, the host includes a graphical user interface (GUI) for setting a frequency of the monitoring of the user of the data. Furthermore, the plurality of trays of different types further includes a tray of third type having at least one hard drive, and a composite score of price, capacity, performance and function of the tray of the second type is determined, which is higher than a corresponding composite score of the tray of the third type. Moreover, the transfer module is operable for moving the data to the tray of the third type if the use of the data in the tray of the second type yields less than a second threshold value.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A method of Hierarchical storage management (HSM) for redundant array of independent disks (RAID) is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
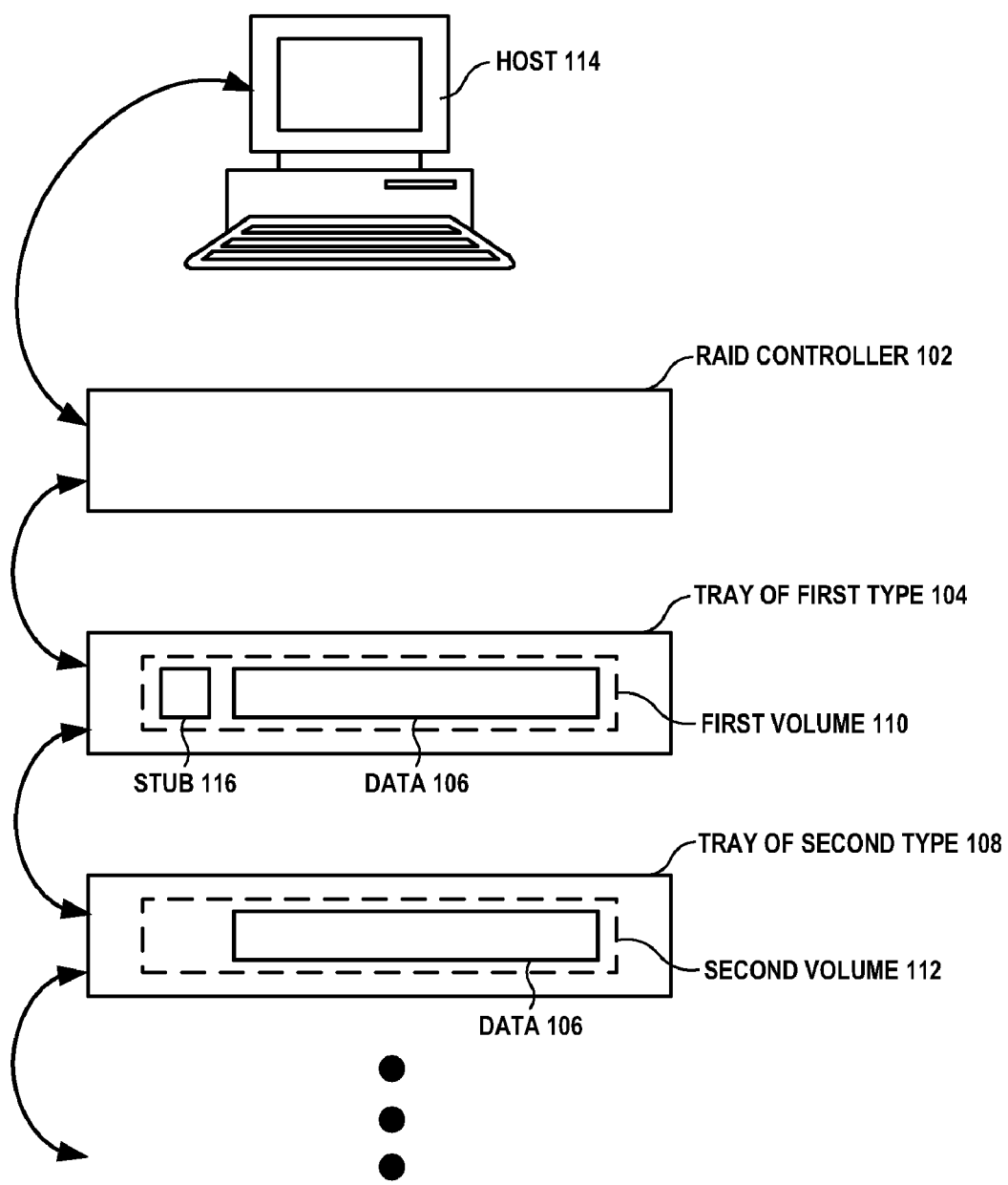
FIG. 1 illustrates an exemplary RAID system for hierarchically managing the RAID, according to one embodiment.

FIG. 1 illustrates an exemplary redundant array of independent disks (RAID) system 100 for hierarchically managing RAID, according to one embodiment. Particularly, FIG. 1 illustrates a RAID controller 102 coupled to a plurality of trays of different types (e.g., a tray of a first type 104 and a tray of a second type 108 and so on) and a host 114.

In operation, data 106 is written on the tray of first type 104 (i.e., tray containing high performance drive). It can be noted that, the tray of the first type 104 includes high composite score of price, capacity, performance and function drives. For example, the tray of first type 104 may include 4600 drive tray.

In one exemplary implementation, the data 106 is written to the tray of the first type 104 by creating at least one volume (e.g., the first volume 110 and the second volume 112) across the tray of the first type 104 and the tray of the second type 108 respectively, mapping the first volume 110 to the host 114 which subscribes to the RAID, and writing the data 106 to the first volume 110.

Further, the RAID controller 102 (e.g., the storage subsystem) checks for data 106 which has not been accessed for a certain amount of time (e.g., X). In one example embodiment, X can be varied based on requirement. Further in operation, the RAID controller 102 moves the data 106 (i.e., which has not been accessed for the X amount of time) from the tray of the first type 104 to the tray of the second type 108 (i.e., a tray containing low performance drive). In one example embodiment, the second volume 112 is created for the tray of the second type 108 to store the data 106. In one example embodiment, the tray of the second type 108 includes low composite score of price, capacity, performance and function drives. For example, the tray of second type 108 may include a 2610 drive tray.

As a result of performing the transfer of data 106 from high speed drives to low speed drives, the high speed drives are freed up for storing frequently accessed data. It is appreciated that, the above process is repeated and data 106 moves to further less expensive drive trays (e.g., 2600 drive tray), every time, when the RAID controller 102 meets the criteria set for less frequent data accessed.

In another exemplary implementation, when the data 106 are migrated from high speed drives to low speed drives, a stub 116 is created on the high speed drive. While retrieving the data, the stub 116 can be accessed first and this in turn, retrieves the data 106 stored in the low speed drives.

Figure 2:
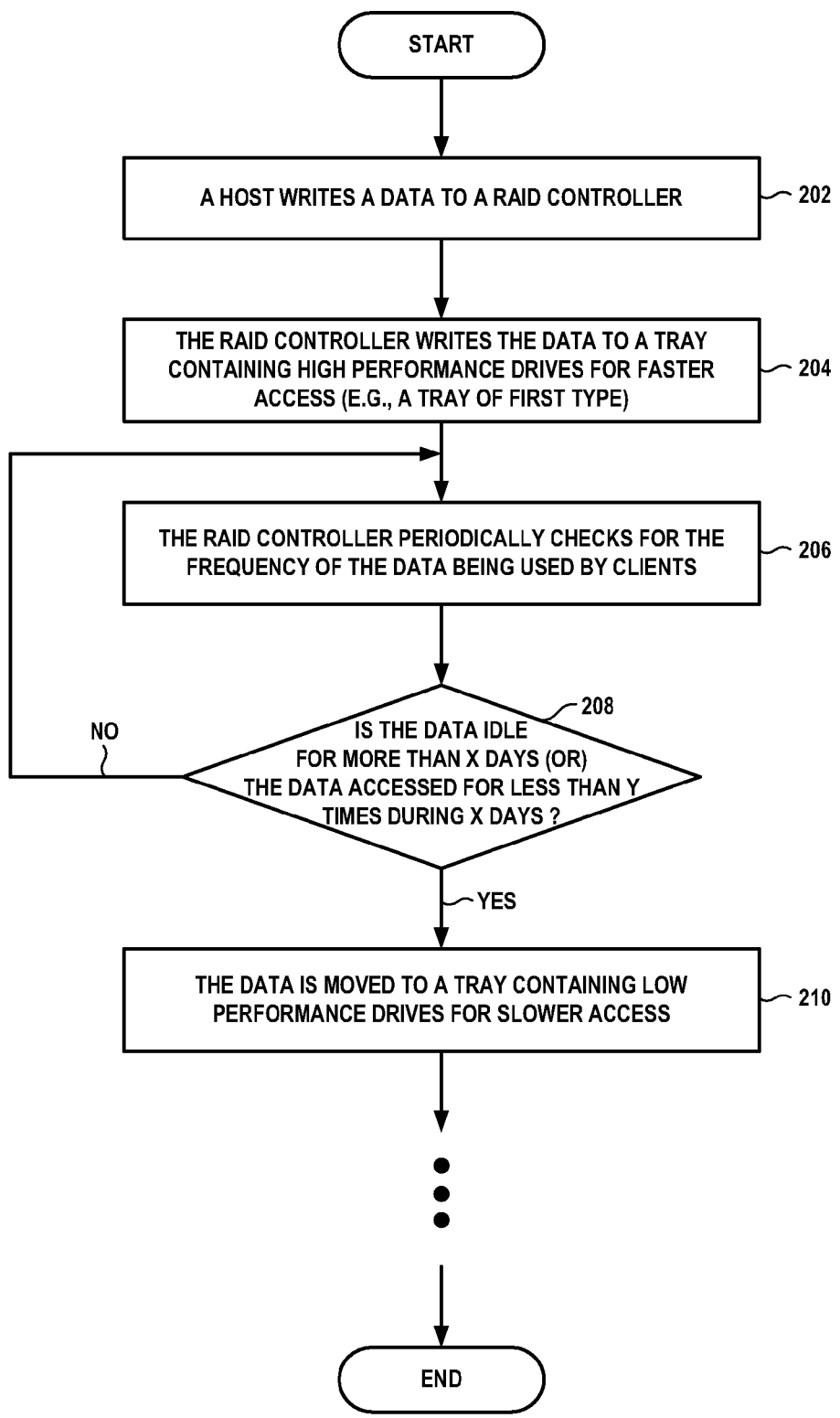
FIG. 2 is an exemplary flow chart which illustrates the RAID system of FIG. 1, according to one embodiment.

FIG. 2 is an exemplary flow chart 200 which illustrates the RAID system 100 of FIG. 1, according to one embodiment. In step 202, data 106 is written to the RAID controller 102 by the host 114. In step 204, the data 106 is written to a tray containing high performance drives (i.e. the tray of the first type 104 as shown in FIG. 1) for faster access by the RAID controller 102. In step 206, the frequency of data 106 being used by clients is periodically checked by the RAID controller 102.

In step 208, the RAID controller 102 determines whether the data 106 is idle for more than X days. In other words, the RAID controller 102 determines whether the data 106 is accessed for less than Y times during X days, where X and Y are variables that are defined based on client requirement. If the data 106 is not idle for more than X days, the process 200 goes to step 206.

In step 210, the data 106 is moved to a tray containing low performance drives (i.e., the tray of the second type 108 as shown in FIG. 1) for slower access by the RAID controller 102, if the data 106 is idle for more than X days. In one embodiment, the data 106 is moved to a tray containing further low performance drives (i.e., performance less than the tray of the second type 108) for slower access by the RAID controller 102 every time the RAID controller 102 meets the above criteria set for less frequent data accessed.

In one example embodiment, the above steps 206-210 are repeated and the data 106 moves to trays containing further low performance drives every time the RAID controller 102 meets the above criteria set for less frequent data accessed. It is appreciated that, by moving the data 106 from trays of high performance drives to trays of low performance drives, high performance drives are freed up for frequently accessed data. Hence, it can be noted that, implementing the HSM on the RAID can reduce cost, improve performance and access times, and assist in making data more accessible to the users. Hence, the users may get frequently accessed data faster. The HSM technology integrated with the RAID controller provides a complete array storage solution.

Figure 3:
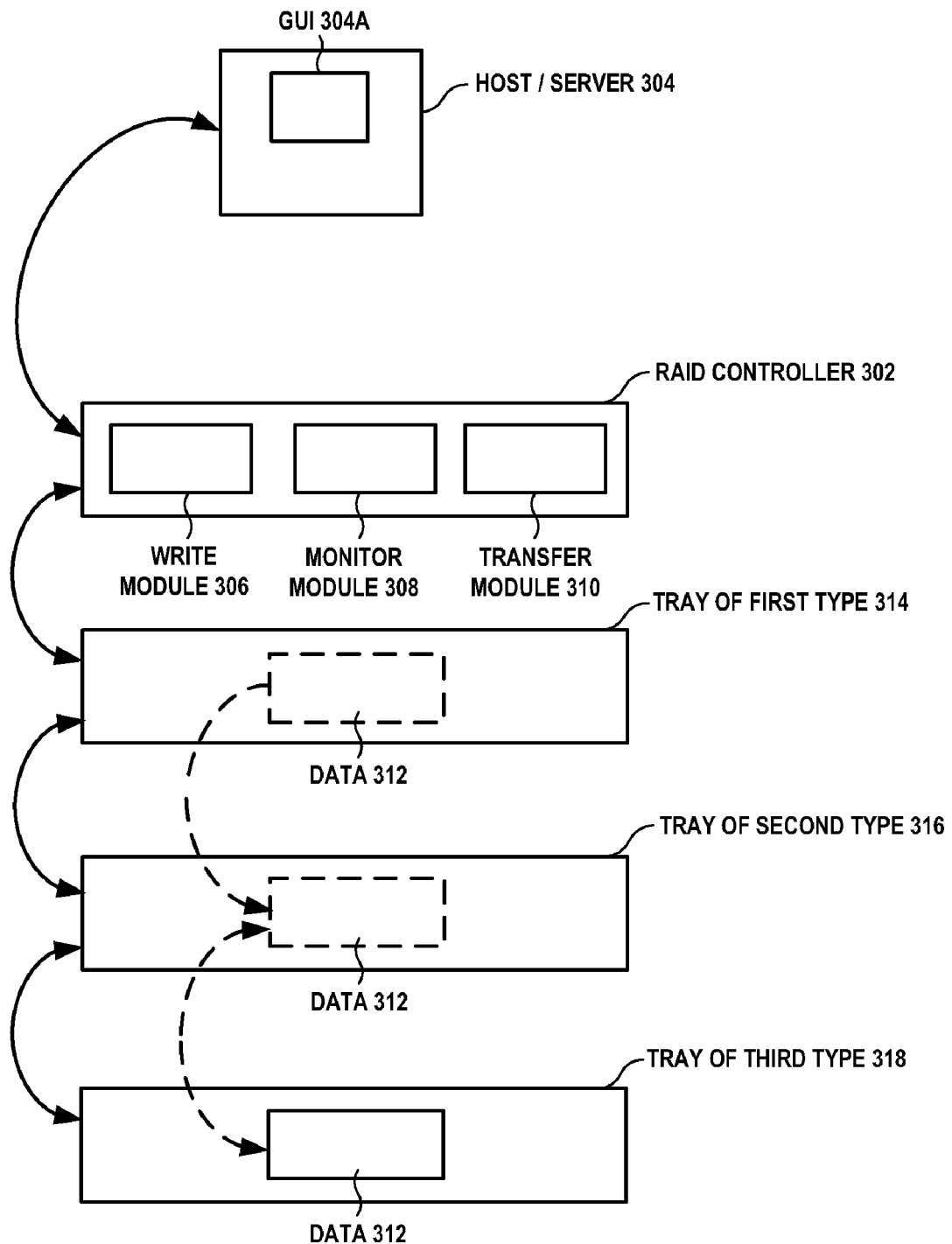
FIG. 3 illustrates an exemplary RAID controller for hierarchically managing a tiered layer of RAID, according to one embodiment.

FIG. 3 illustrates an exemplary RAID controller 300 for hierarchically managing a tiered layer of RAID, according to one embodiment. Particularly, FIG. 3 illustrates a RAID controller 302, a host/server 304, and a plurality of trays (i.e., a tray of a first type 314, a tray of a second type 316 and a tray of a third type 318). As shown in FIG. 3, the host/server 304 includes a graphical user interface (GUI) 304A.

Further as shown in FIG. 3, the RAID controller 302 includes a write module 306, a monitor module 308 and a transfer module 310. Furthermore, the RAID controller 302 is coupled to the host/server 304 and a plurality of trays of different types for hierarchically managing the RAID.

In operation, the write module 306 writes data 312 to the tray of the first type 314. Further, the monitor module 308 periodically monitors a use of the data 312. In one exemplary implementation, the host/server 304 includes the GUI 304A for setting a frequency of the monitoring of the use of the data 312.

Further in operation, the transfer module 310 moves the data 312 from the tray of the first type 314 to the tray of the second type 316 if the use of the data 312 yields less than a threshold value. In one example embodiment, each one of the tray of the first type 314 and the tray of the second type 316 includes at least one hard drive. It further includes a composite score of price, capacity, performance and function of the tray of the first type 314, which is higher than a respective composite score of the tray of the second type 316.

In the example embodiment illustrated in FIG. 3, the plurality of trays of different types also includes the tray of third type 318 having at least one hard drive, and a composite score of price, capacity, performance and function of the tray of the second type 316, which is higher than a corresponding composite score of the tray of the third type 318. In operation, the transfer module 310 moves the data 312 to the tray of the third type 318 if the use of the data in the tray of the second type 316 yields less than a second threshold value.

Figure 4:
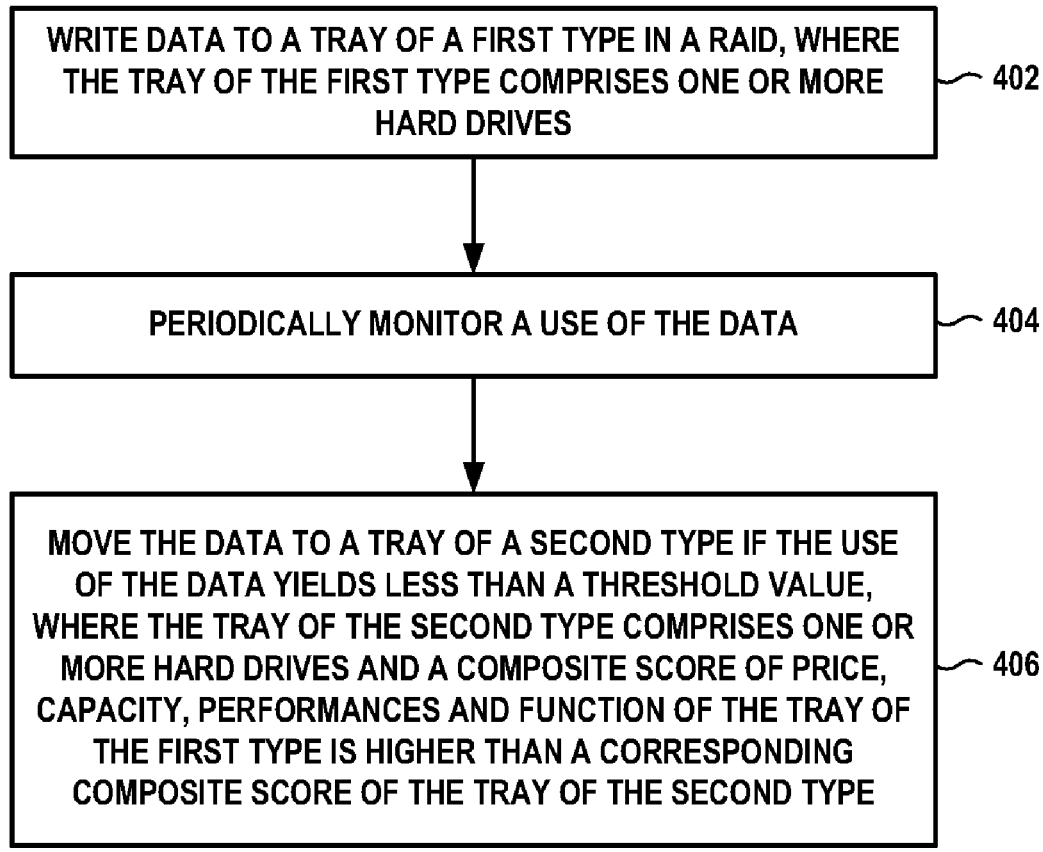
FIG. 4 is a process flow chart of an exemplary method for hierarchically managing the RAID, according to one embodiment.

FIG. 4 is a process flow chart 400 of an exemplary method for hierarchically managing redundant array of independent disks (RAID), according to one embodiment. In one example embodiment, the RAID includes a number of drive trays of different types. In step 402, data is written to a tray (e.g., of the number of drive trays) of a first type in the RAID. In one example embodiment, the tray of the first type includes one or more hard drives. In one exemplary implementation, writing the data to the tray of the first type includes creating at least one volume across the tray of the first type and a tray of a second type, mapping the at least one volume to at least one host which subscribes to the RAID, and writing the data to the at least one volume. In one example embodiment, writing the data includes writing the data in a block.

In step 404, a use of the data is monitored periodically. In one exemplary implementation, monitoring the use of the data includes determining how many times the data has been accessed for a given period of time. In another example embodiment, monitoring the use of the data includes determining how long the data has been idle.

In step 406, the data is moved to a tray of a second type if the use of the data yields less than a threshold value. In one example embodiment, the tray of the second type includes one or more hard drives. In one exemplary implementation, a composite score of price, capacity, performance and function of the tray of the first type is higher than a corresponding composite score of the tray of the second type.

In one exemplary implementation, moving the data to the tray of the second type includes writing the data to the tray of the second type, and deleting the data from the tray of the first type. In another exemplary implementation, moving the data to the tray of the second type includes generating a stub for the data which points to a location of the data on the tray of the second type. Further, the stub is accessed to retrieve the data from the tray of the second type.

A computer readable medium for hierarchically managing redundant array of independent disks (RAID) which comprise a plurality of drive trays of different types having instructions that, when executed by a computer, cause the computer to perform the method of FIG. 4.

The above mentioned method improves access time and performance of the RAID by storing most frequently used data on high speed drives. The above mentioned method also reduces cost of storing data by moving the data (i.e., data which has been not used for a certain amount of time) to the less expensive/low speed drives. The above mentioned method also enables the customers to look storage arrays as a storage solution than just means of storing data. Further, the data more easily accessible to users and reduces administration time.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

What is claimed is:

1. A method for hierarchically managing redundant array of independent disks (RAID) which comprise a plurality of drive trays of different types, the method comprising:
   writing data to a tray of a first type;
   periodically monitoring a use of the data; and
   moving the data to a tray of a second type if the use of the data yields less than a threshold value,
      wherein each one of the tray of the first type and the tray of the second type comprises at least one hard drive; and wherein a composite score of price, capacity, performance and function of the tray of the first type is higher than a corresponding composite score of the tray of the second type.

2. The method of claim 1, wherein the writing the data to the tray of the first type comprises:
   creating at least one volume across the tray of the first type and the tray of the second type;
   mapping the at least one volume to at least one host which subscribes to the RAID; and
   writing the data to the at least one volume.

3. The method of claim 1, wherein the writing the data comprises writing the data in a block.

4. The method of claim 1, wherein the monitoring the use of the data comprises determining how many times the data has been accessed for a given period of time.

5. The method of claim 1, wherein the monitoring the use of the data comprises determining how long the data has been idle.

6. The method of claim 1, wherein the moving the data to the tray of the second type comprises:
   writing the data to the tray of the second type; and
   deleting the data from the tray of the first type.

7. The method of claim 1, wherein the moving the data to the tray of the second type comprises generating a stub for the data which points to a location of the data on the tray of the second type.

8. The method of claim 7, further comprising accessing the stub to retrieve the data from the tray of the second type.

9. A computer readable medium for hierarchically managing redundant array of independent disks (RAID) which comprise a plurality of drive trays of different types having instructions that, when executed by a computer, cause the computer to perform a method comprising:
   writing data to a tray of a first type;
   periodically monitoring a use of the data; and
   moving the data to a tray of a second type if the use of the data yields less than a threshold value,
      wherein each one of the tray of the first type and the tray of the second type comprises at least one hard drive; and wherein a composite score of price, capacity, performance and function of the tray of the first type is higher than a corresponding composite score of the tray of the second type.

10. The computer readable medium of claim 9, wherein the initially writing the data to the tray of the first type comprises:
    creating at least one volume across the tray of the first type and the tray of the second type;
    mapping the at least one volume to at least one host which subscribes to the RAID; and
    writing the data to the at least one volume.

11. The computer readable medium of claim 9, wherein the writing data comprises writing the data in a block.

12. The computer readable medium of claim 9, wherein the monitoring the use of the data comprises determining how many times the data has been accessed for a given period of time.

13. The computer readable medium of claim 9, wherein the monitoring the use of the data comprises determining how long the data has been idle.

14. The computer readable medium of claim 9, wherein the moving the data to the tray of the second type comprises:
    writing the data to the tray of the second type; and
    deleting the data from the tray of the first type.

15. The computer readable medium of claim 9, wherein the moving the data to the tray of the second type comprises generating a stub for the data which points to a location of the data on the tray of the second type.

16. The computer readable medium of claim 15, further comprising accessing the stub to retrieve the data from the tray of the second type.

17. A RAID controller coupled to a host and a plurality of trays of different types for hierarchically managing redundant array of independent disks (RAID), comprising:
    a write module for writing data to a tray of a first type;
    a monitor module for periodically monitoring a use of the data; and
    a transfer module for moving the data to a tray of a second type if the use of the data yields less than a threshold value,
       wherein each one of the tray of the first type and the tray of the second type comprises at least one hard drive; and wherein a composite score of price, capacity, performance and function of the tray of the first type is higher than a respective composite score of the tray of the second type.

18. The RAID controller of claim 17, wherein the host comprises a graphical user interface (GUI) for setting a frequency of the monitoring of the use of the data.

19. The RAID controller of claim 18, wherein the plurality of trays of different types further comprises a tray of third type having at least one hard drive, and wherein a composite score of price, capacity, performance and function of the tray of the second type is higher than a corresponding composite score of the tray of the third type.

20. The RAID controller of claim 19, wherein the transfer module is operable for moving the data to the tray of the third type if the use of the data in the tray of the second type yields less than a second threshold value.

* * * * *